(12) United States Patent
Burli et al.

(10) Patent No.: US 10,540,190 B2
(45) Date of Patent: Jan. 21, 2020

(54) GENERIC CONNECTOR MODULE CAPABLE OF INTEGRATING MULTIPLE APPLICATIONS INTO AN INTEGRATION PLATFORM

(71) Applicant: International Business Machines Corporation, Armonk, NY (US)

(72) Inventors: Aditya M. Burli, Bangalore (IN); Subramanian Krishnan, Bangalore (IN); Ramya Rajendiran, Bangalore (IN); Nagarjuna Surabathina, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 15/464,720

(22) Filed: Mar. 21, 2017

(65) Prior Publication Data
US 2018/0278471 A1    Sep. 27, 2018

(51) Int. Cl.
*G06F 15/173* (2006.01)
*G06F 9/451* (2018.01)

(52) U.S. Cl.
CPC .................................. *G06F 9/451* (2018.02)

(58) Field of Classification Search
CPC ... G06F 9/451; G06F 9/46; G06F 8/31; G06F 8/36; H04L 12/24228; H04L 12/2441; H04L 12/2447; H04L 12/2458; H04L 12/2424; H04L 41/08; H04L 41/0803; H04L 41/0813; H04L 41/0853; H04L 41/0893; H04L 41/0866; H04L 41/0806; H04L 41/5054

USPC ................................. 709/220, 221; 370/254
See application file for complete search history.

(56) References Cited

U.S. PATENT DOCUMENTS

| | | | | |
|---|---|---|---|---|
| 6,334,158 B1 * | 12/2001 | Jennyc | ...................... | G06F 8/20 713/1 |
| 6,567,796 B1 * | 5/2003 | Yost | .................... | H04L 41/5035 |
| 6,880,086 B2 * | 4/2005 | Kidder | ...................... | G06F 1/14 713/177 |

(Continued)

*Primary Examiner* — Thu Ha T Nguyen
(74) *Attorney, Agent, or Firm* — Schmeiser, Olsen & Watts; William H. Hartwell

(57) ABSTRACT

A generic connector module of an integration-platform system reconciles the system's application-independent canonical API with each application-specific API used by an endpoint application. The system generates a software library of application-specific configuration files each capable of enabling the connector to translate commands between one application-specific API format and the canonical-API format. Applications may be added to the system, removed, or updated without revising the connector. When the connector receives an application-specific request from an application or a canonical request from the integration platform, the connector selects an application-specific configuration file that lets the connector translate the received request into its complementary API format. The connector then forwards the translated request to its intended recipient. A converse process occurs when receiving an application-specific or canonical response to the translated request. Translations can be performed dynamically, in real time, without requiring a distinct connector module dedicated to each application.

17 Claims, 5 Drawing Sheets

(56) References Cited

U.S. PATENT DOCUMENTS

| | | | | |
|---|---|---|---|---|
| 7,013,084 B2* | 3/2006 | Battou | G06F 8/65 | 398/45 |
| 7,761,591 B2* | 7/2010 | Graham | G06Q 40/02 | 709/204 |
| 7,831,693 B2* | 11/2010 | Lai | G06Q 10/10 | 706/27 |
| 8,850,420 B2* | 9/2014 | Yousouf | G06F 8/65 | 709/219 |
| 8,862,975 B2* | 10/2014 | Liao | G06F 3/048 | 715/200 |
| 8,868,692 B1* | 10/2014 | Khanna | H04L 41/0866 | 709/219 |
| 9,608,997 B2* | 3/2017 | Nicodemus | G06F 11/3495 | |
| 9,917,888 B1* | 3/2018 | Bonagiri | H04L 41/024 | |
| 10,205,626 B2* | 2/2019 | Ram | H04L 41/0213 | |
| 2003/0105887 A1* | 6/2003 | Cox | G06F 8/20 | 719/328 |
| 2005/0038779 A1* | 2/2005 | Fernandez | G06F 17/22 | |
| 2006/0090171 A1* | 4/2006 | Laborczfalvi | G06F 9/451 | 719/328 |
| 2006/0092861 A1* | 5/2006 | Corday | H04L 41/0213 | 370/256 |
| 2006/0112123 A1* | 5/2006 | Clark | G06F 17/246 | |
| 2006/0136601 A1* | 6/2006 | Arora | H04L 69/08 | 709/246 |
| 2006/0168070 A1* | 7/2006 | Thompson | G06F 9/542 | 709/206 |
| 2007/0217436 A1* | 9/2007 | Markley | H04L 12/2803 | 370/401 |
| 2008/0037532 A1* | 2/2008 | Sykes | H04L 41/147 | 370/389 |
| 2008/0235611 A1* | 9/2008 | Fraley | G06F 9/44505 | 715/772 |
| 2010/0217837 A1* | 8/2010 | Ansari | G06Q 30/04 | 709/218 |
| 2010/0257518 A1* | 10/2010 | Baratti | G06F 8/65 | 717/168 |
| 2011/0166849 A1* | 7/2011 | Dube | G06Q 10/10 | 703/23 |
| 2012/0143938 A1* | 6/2012 | du Preez | G06F 8/65 | 709/201 |
| 2012/0257499 A1* | 10/2012 | Chatterjee | H04W 28/0284 | 370/232 |
| 2014/0007051 A1* | 1/2014 | Ritter | G06F 8/36 | 717/121 |
| 2014/0195675 A1* | 7/2014 | Silver | H04L 65/1083 | 709/224 |
| 2015/0242476 A1* | 8/2015 | Bender | G06F 16/254 | 707/602 |
| 2016/0139910 A1* | 5/2016 | Ramanathan | G06F 8/65 | 717/170 |
| 2016/0306613 A1* | 10/2016 | Busi | G06F 11/3668 | |
| 2017/0094445 A1* | 3/2017 | Shanmugam | H04L 41/0806 | |
| 2017/0134232 A1* | 5/2017 | Palanciuc | H04L 41/0893 | |
| 2017/0264493 A1* | 9/2017 | Cencini | H04L 41/044 | |
| 2017/0300314 A1* | 10/2017 | Lopyrev | H04L 67/1097 | |
| 2017/0339065 A1* | 11/2017 | Li | H04L 43/0817 | |
| 2018/0248775 A1* | 8/2018 | Qin | H04L 41/0853 | |
| 2018/0253367 A1* | 9/2018 | Stabnow | G06F 11/3409 | |
| 2018/0278471 A1* | 9/2018 | Burli | G06F 8/31 | |
| 2019/0049933 A1* | 2/2019 | Qawami | G05B 19/4188 | |
| 2019/0149400 A1* | 5/2019 | Plache | H04L 41/0803 | 709/220 |
| 2019/0166000 A1* | 5/2019 | Luo | H04L 67/12 | |
| 2019/0266012 A1* | 8/2019 | Chou | G06F 9/485 | |

* cited by examiner

GENERIC CONNECTOR MODULE CAPABLE OF INTEGRATING MULTIPLE APPLICATIONS INTO AN INTEGRATION PLATFORM

BACKGROUND

The present invention relates generally to computerized integration platforms and specifically relates to improving the efficiency of communications between an integration platform and the endpoint applications managed by the integration platform.

A computerized integration platform integrates disparate "endpoint" user applications with a single underlying computing platform, such as a cloud-computing platform or an enterprise-computing platform. This allows the underlying platform to service a variety of endpoint applications, regardless of which communications mechanism each application may use to request or receive services from the platform.

SUMMARY

An embodiment of the present invention provides a generic connector module of an integration-platform system comprising a processor, a memory coupled to the processor, and a computer-readable hardware storage device coupled to the processor, the storage device containing program code configured to be run by the processor via the memory to implement a method for integrating a set of endpoint applications into a computing platform, the method comprising:

receiving, from the integration-platform system, a canonical service request generated by the integration-platform system, where the canonical service request is configured in compliance with conventions of a canonical application programming interface, where the canonical service request was generated in response to the integration-platform system intercepting a communication sent by the computing platform, where the communication was originally directed to a first application of the set of endpoint applications, and where the canonical service request is associated with first identifying information capable of identifying the first application;

selecting, as a function of the first identifying information, a first configuration file of a set of application-specific configuration files;

extracting first configuration data from the first configuration file, where the first configuration data is specific to the first application;

generating an application-specific service request that is functionally equivalent to the canonical service request, where the application-specific service request s configured, as a function of the first configuration data, in compliance with conventions of a first application-specific application programming interface associated with the first application; and transmitting the application-specific service request to the first application.

Another embodiment of the present invention provides a method for integrating a set of endpoint applications into a computing platform, the method comprising:

receiving, from an integration-platform system by a generic connector module, a canonical service request generated by the integration-platform system, where the canonical service request is configured in compliance with conventions of a canonical application programming interface, where the canonical service request was generated in response to the integration-platform system intercepting communication sent by the computing platform, where the communication was originally directed to a first application of a set of endpoint applications, and where the canonical service request is associated with first identifying information capable of identifying the first application;

selecting, as a function of the first identifying information, a first configuration file of a set of application-specific configuration files;

extracting first configuration data from the first configuration file, where the first configuration data is specific to the first application;

generating an application-specific service request that is functionally equivalent to the canonical service request, where the application-specific service request s configured, as a function of the first configuration data, in compliance with conventions of a first application-specific application programming interface associated with the first application; and transmitting the application-specific service request to the first application.

Yet another embodiment of the present invention provides a computer program product, comprising a computer-readable hardware storage device having a computer-readable program code stored therein, the program code configured to be executed by an integration-platform system comprising a processor, a memory coupled to the processor, and a computer-readable hardware storage device coupled to the processor, the storage device containing program code configured to be run by the processor via the memory to implement a method for generic connector module of an integration-platform system comprising a processor, a memory coupled to the processor, and a computer-readable hardware storage device coupled to the processor, the storage device containing program code configured to be run by the processor via the memory to implement a method for integrating a set of endpoint applications into a computing platform, the method comprising:

receiving, from the integration-platform system, a canonical service request generated by the integration-platform system, where the canonical service request is configured in compliance with conventions of a canonical application programming interface, where the canonical service request was generated in response to the integration-platform system intercepting a communication sent by the computing platform, where the communication was originally directed to a first application of the set of endpoint applications, and where the canonical service request is associated with first identifying information capable of identifying the first application;

selecting, as a function of the first identifying information, a first configuration file of a set of application-specific configuration files;

extracting first configuration data from the first configuration file, where the first configuration data is specific to the first application;

generating an application-specific service request that is functionally equivalent to the canonical service request, where the application-specific service request configured, as a function of the first configuration data, in compliance with conventions of a first application-specific application programming interface associated with the first application; and transmitting the application-specific service request to the first application.

DETAILED DESCRIPTION

Figure 1:
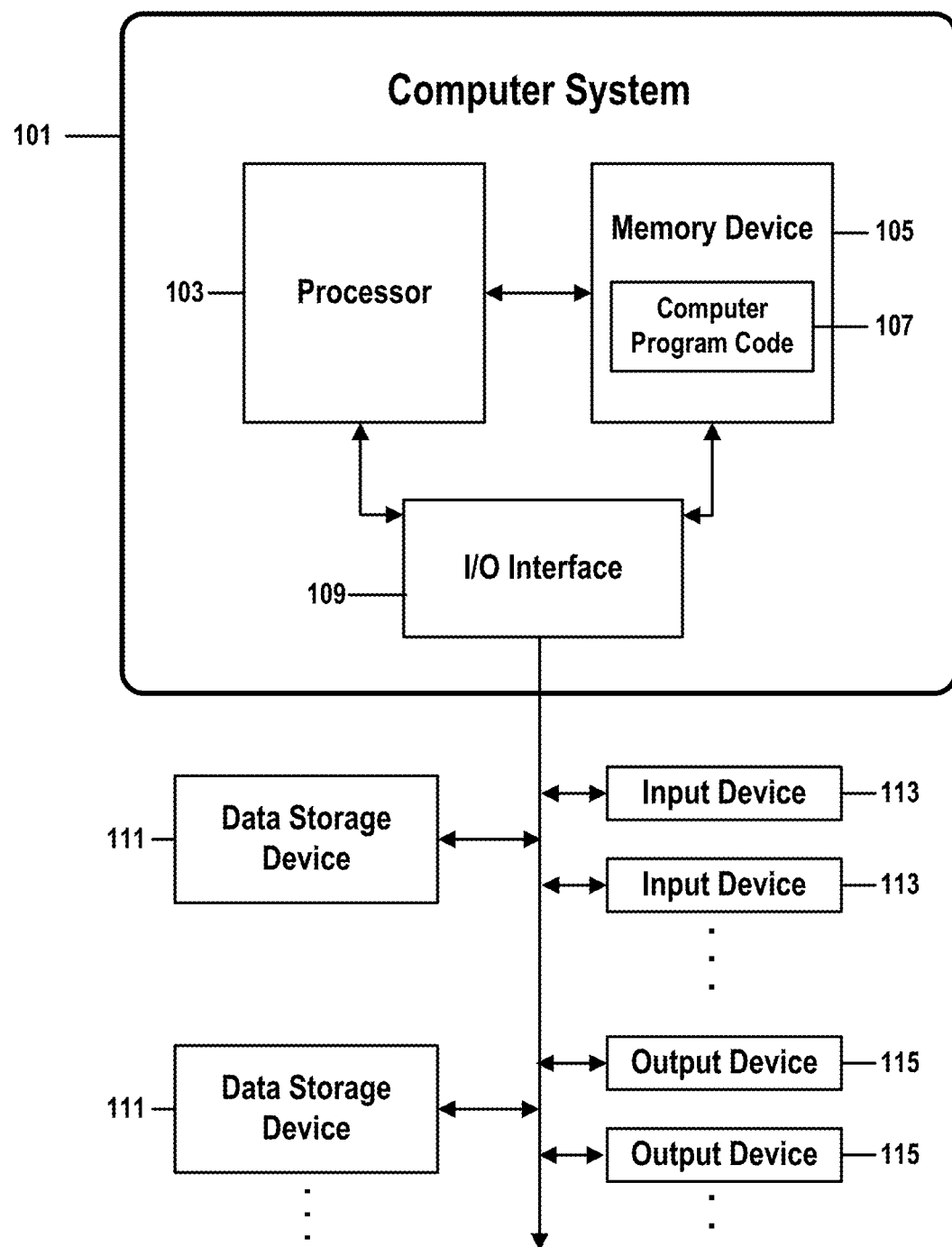
FIG. 1 shows the structure of a computer system and computer program code that may be used to implement a method for a generic connector module capable of integrating multiple applications into an integration platform in accordance with embodiments of the present invention.

Embodiments of the present invention comprise a technology-based solution to a technical problem rooted in computerized platform-integration technology. More specifically, embodiments solve the API-interoperability problem described in the BACKGROUND section by replacing a potentially huge set of endpoint application-specific connectors with a single generic connector capable of mapping communications between a data format of the platform's canonical API and the formats of multiple application-specific APIs used by endpoint applications.

A computerized integration platform integrates disparate "endpoint" user applications with a single underlying computing platform, such as a cloud-computing platform or an enterprise-computing platform. This allows the underlying platform to service a variety of endpoint applications, regardless of which communications mechanism each application may use to request or receive services from the platform.

A technology-based problem arises when an endpoint application tries to communicate with the underlying platform by means of an application-specific API (or application programming interface) that is incompatible with the API understood by the platform. This is true regardless of whether the endpoint API complies with a native, proprietary convention or conforms to open API standards known in the art, such as SOAP ("Simple Object Access Protocol") or REST ("REpresentational State Transfer").

Most integration platforms enable such communication by translating each endpoint application's application-specific API service requests into a form compliant with a generalized "canonical" API understood by the integration platform; and, conversely, by further translating canonical-API responses returned by the integration platform into a format compliant with a recipient application's application-specific API.

Such translation between an endpoint application's API and the platform's canonical API may be performed by an intermediary "connector" module that maps communications between the two API formats. Because each endpoint application may conform to a different API, or may require a different subset of a particular API's functionality, each connector must be expressly coded to map a single application's specific API calls.

In large computing environments that may comprise thousands of applications, the need to hard-code, debug, and maintain a connector module for each application can introduce undesirable complexity to an integration platform.

There is thus a need for a more efficient, more easily maintained, and more easily implemented method of allowing endpoint applications to communicate with an integration platform that recognizes a platform-specific canonical API.

Embodiments solve this problem by generating a small configuration data file for each application. These configurations may be accessed by the generic connector in a manner similar to the way that a programming-language compiler accesses library routines.

Such a configuration file may be built far more easily than a full-blown connector module. A traditional, application-specific connector, as is known in the art, must generally be implemented as a customized plug-in software module expressly designed to accommodate a generic interface and I/O operations made visible to extrinsic programs by a particular application's API.

A configuration file, on the other hand, does not require writing, debugging, compiling, and deploying computer code. A configuration file is instead a simple data structure that may be constructed from easily accessible information about each endpoint application's API system calls. Whenever a new endpoint application is added to a platform, that application's corresponding configuration file may be easily added to a library of configuration files available to the generic connector without incurring platform downtime to rebuild and redeploy connector modules of the integration platform.

In this manner, embodiments of the present invention make it possible to add any application, comprising any sort of API, to an integration platform without having to write application-specific code. They also make it possible to scale an integration platform to very large computing platforms, capable of integrating many thousands of applications by means of a single connector file.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet n Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for a generic connector module capable of integrating multiple applications into an integration platform in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for a generic connector module capable of integrating multiple applications into an integration platform in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for a generic connector module capable of integrating multiple applications into an integration platform.

Any of the components of the present invention could be created, integrated, hosted, maintained, deployed, managed, serviced, supported, etc. by a service provider who offers to facilitate a method for a generic connector module capable of integrating multiple applications into an integration platform. Thus the present invention discloses a process for deploying or integrating computing infrastructure, comprising integrating computer-readable code into the computer system 101, wherein the code in combination with the computer system 101 is capable of performing a method for a generic connector module capable of integrating multiple applications into an integration platform.

One or more data storage units 111 (or one or more additional memory devices not shown in FIG. 1) may be used as a computer-readable hardware storage device having a computer-readable program embodied therein and/or having other data stored therein, herein the computer-readable program comprises stored computer program code 107. Generally, a computer program product (or, alternatively, an article of manufacture) of computer system 101 may comprise the computer-readable hardware storage device.

While it is understood that program code 107 for a method for a generic connector module capable of integrating multiple applications into an integration platform may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for a generic connector module capable of integrating multiple applications into an integration platform is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown) where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
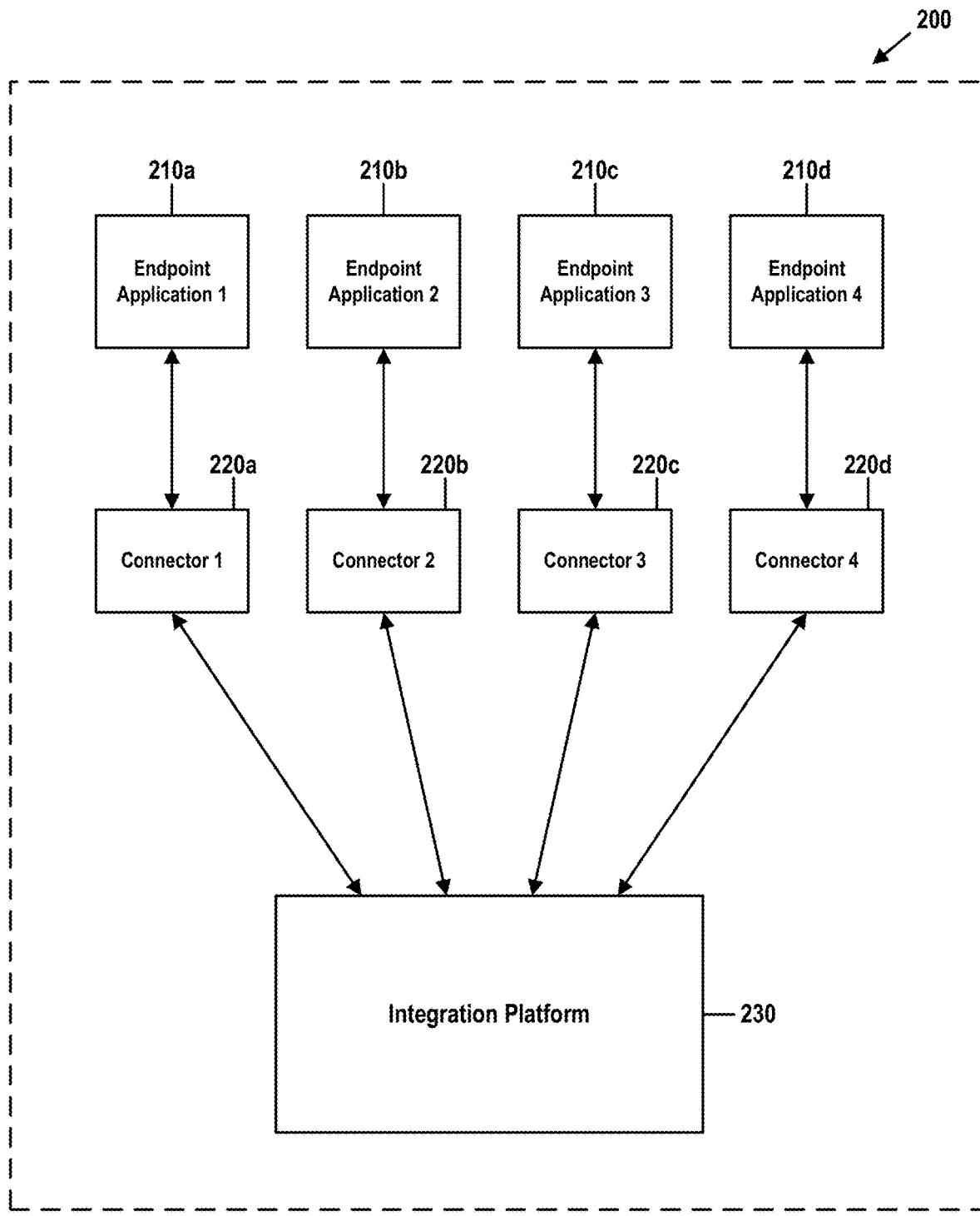
FIG. 2 shows a connector architecture used by current integration platforms used to facilitate communications with endpoint applications.

FIG. 2 shows a connector architecture 200 used by current integration platforms used to facilitate communications with endpoint applications 210a-210d. FIG. 2. comprises items 200-230.

Integration-platform connector architecture 200 comprises one or more endpoint applications 210a-210d that are each interfaced to an integration-platform 230 by a corresponding connector module 220a-220d. Each endpoint application 210a-210d requests services and receives responses to such requests from the integration platform 230 or from an underlying computing platform managed by the integration platform 230. Such an underlying computing platform may include any combination of cloud-computing platforms, non-cloud virtualized computing environments, non-virtualized computing environments, or hybrid computing environments.

Each endpoint application 210a-210d sends such requests and expects such responses to conform to conventions of an application-specific application programming interface (or "API") that may be specific to a particular application 210a, 210b, 210c, or 210d. Such APIs determine data formats, functionality, a choice and format of passed parameters, syntax, and other characteristics of each service request and response. An API may conform to common or open conventions, such as SOAP or REST, or may follow a proprietary, vendor-specific, or application-exclusive format. Embodiments of the present invention flexible enough to accommodate any known proprietary or open API or communications format capable of being mapped to conventions of a canonical API used by the integration platform 230.

The canonical API may comprise any API conventions understood by the integration platform 230 and may be a default or standard communications mechanism of the integration platform 230. Interfacing an endpoint application 210a, 210b, 210c, or 210d thus requires a means of bidirectionally translating communications seen by the integration platform 230, which conform to the canonical API, to and from the application-specific APIs used by each endpoint application 210a-210d.

These translation tasks are performed by connector modules 220a-220d, each of which is a software module programmed to translate platform 230's canonical-API communications into an equivalent form that conforms to an API of one endpoint application 210a, 210b, 210c, or 210d. Because every application 210a-210d is capable of conforming to a different, incompatible API, a distinct connector module 220a-220d may be required for each application 210a-210d.

FIG. 2 thus shows an architecture in which communications between the integration platform 230 and each endpoint application 210a-210d is enabled through the translation services of a connector module 210a, 210b, 210c, or 210d expressly written for a corresponding endpoint application 210a-210d.

Figure 3:
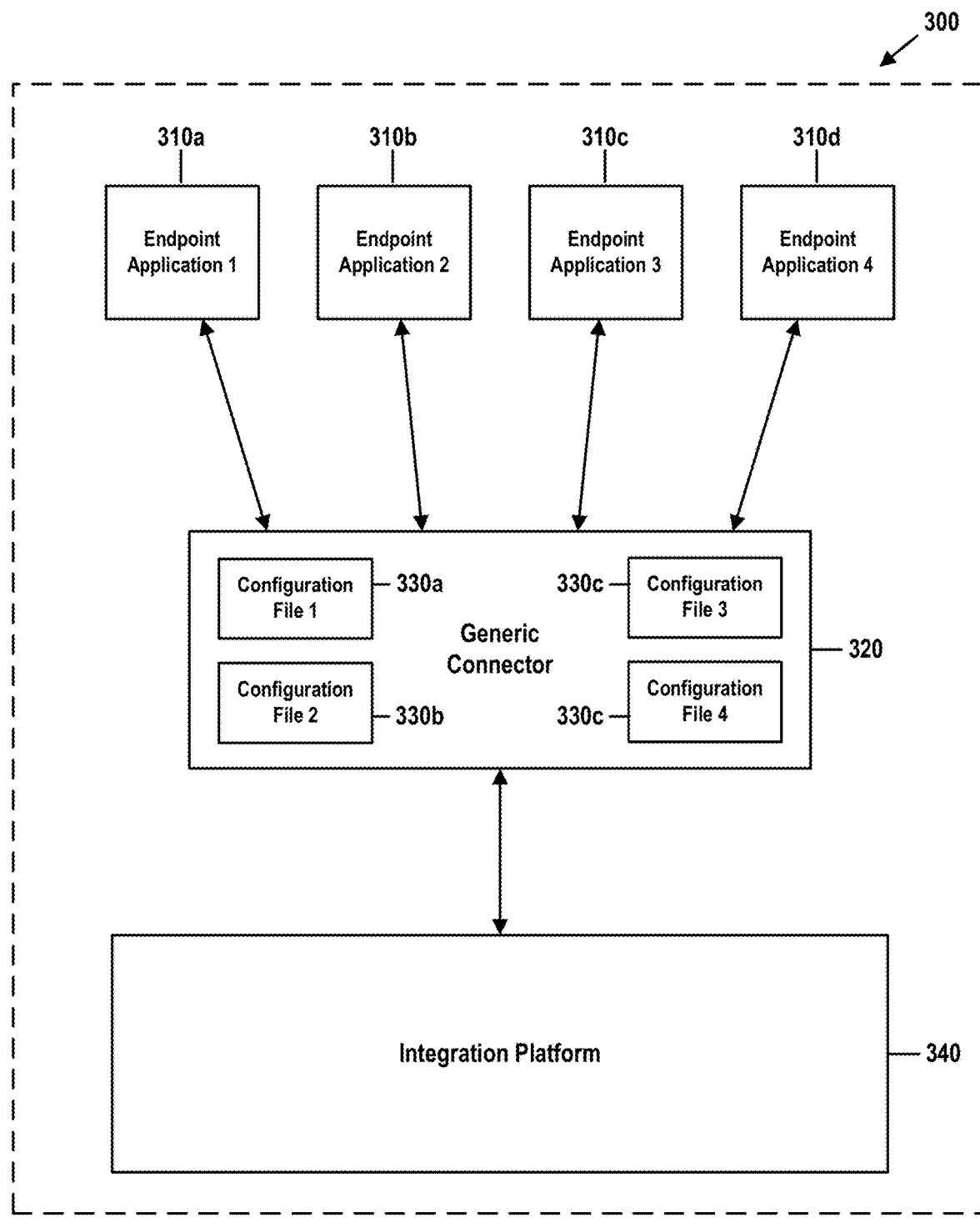
FIG. 3 shows an enhanced integration-platform architecture provided by embodiments of the present invention.

FIG. 3 shows an enhanced integration-platform architecture 300 provided by embodiments of the present invention. FIG. 3 comprises items 300-340.

Endpoint applications 310a-310d. are identical in form and function to the analogously numbered applications 210a-210d of FIG. 2. Similarly, integration application 340 is identical in form and function to integration platform 230 of FIG. 2.

FIG. 3, however, differs from FIG. 2 in that it replaces FIG. 2's set of application-specific connectors 220a-220d with a single generic connector 320. This generic connector 320 communicates with integration platform 340 by exchanging communications that conform with integration platform 340's canonical API. Generic connector 320 also communicates with integration platform 340 by exchanging communications that conform with each of endpoint applications 310a-310d by exchanging communications with each application that application's particular application-specific API. Unlike the application-specific connectors 220a-220d of FIG. 2, the generic connector 320 is capable of understanding more than one application-specific API.

Generic connector 320 accomplishes this task by referring to a set of small configuration files 330a-330d. Each configuration file 330a-330d identifies characteristics of one application-specific API and contains information necessary to translate communications from a form compliant with that application-specific API into a form compliant with the canonical API, and, conversely, to translate canonical API communications into form that is compliant with that application-specific API.

This necessary information may, for example, comprise a list of dependent software modules, libraries, or packages required by an application-specific or canonical API call, steps of a method or function that must be performed in order to service an application-specific or canonical API call, mappings that relate input and output parameters of an application-specific API call with those of a canonical API call, identifications of data formats of input or output parameters of an application-specific or a canonical API call, or descriptors of local, global, or environmental variables associated with the integration platform 340, with the endpoint application 310a-310d, or with an API or API-compliant communication.

In this manner, embodiments of the present invention enable an integration platform 340 to communicate to use a single connector module 320 to communicate with an arbitrary number of endpoint applications 310a-310d, regardless of whether those applications 310a-310d are designed to comply with an open or standard API standard, with a vendor-specific or proprietary API, or with a homebrewed API specific to a custom-designed application 310a, 310b, 310c, or 310d.

Figure 4:
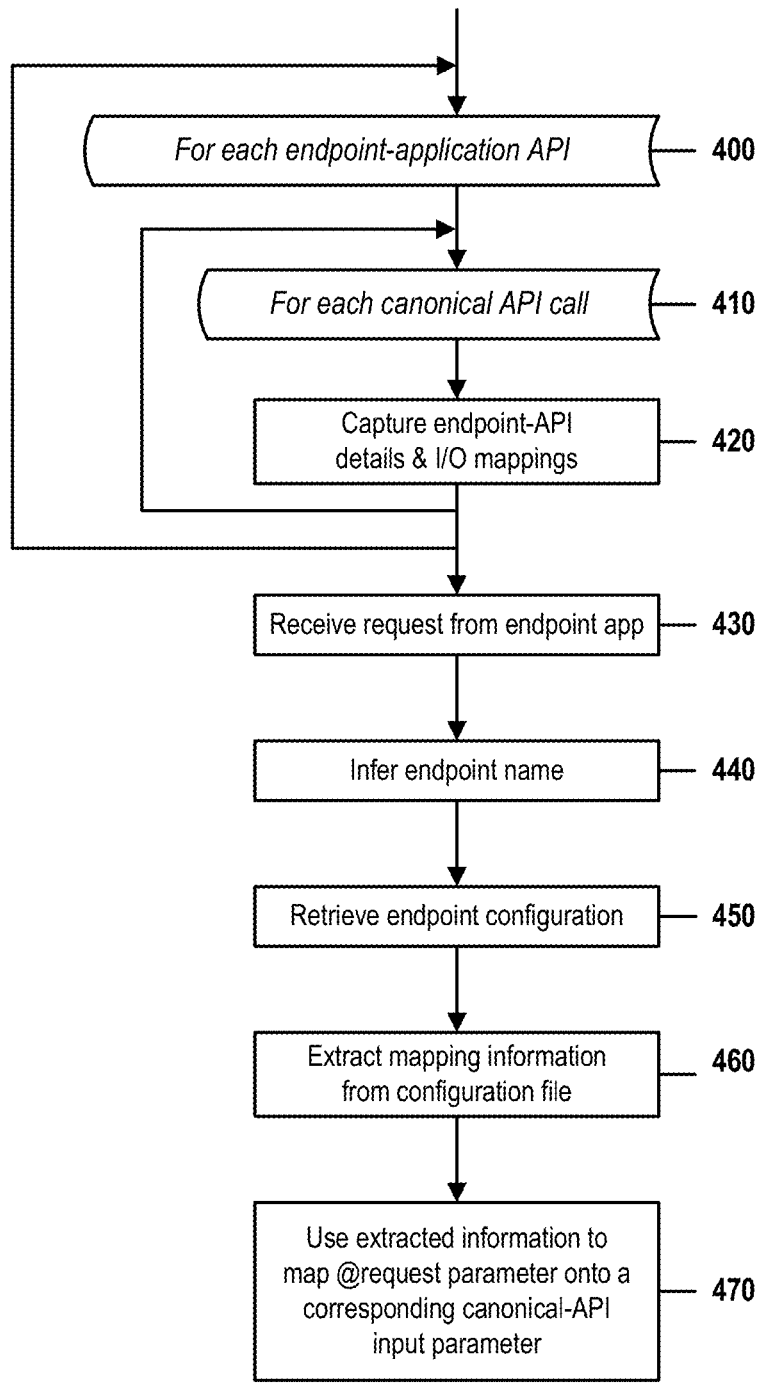
FIG. 4 is a flow chart that illustrates steps of a novel method for translating application-specific service requests into a canonical API format understood by an integration platform.

FIG. 4 is a flow chart that illustrates steps of a novel method for translating application-specific service requests into a canonical API format understood by an integration platform. FIG. 4 comprises items 400-470.

Step 400 initiates an outer iterative procedure of steps 400-420, which repeats once for each endpoint application 310a-310d of an integration platform architecture 300. Each iteration of this outer procedure generates a configuration file 330a-330d capable of interpreting communications between the platform 340 and one endpoint application 310a-310d.

Step 410 initiates an inner iterative procedure of steps 410-420, which repeats once for each API call of the canonical API used by both integration platform 340 and by the endpoint application of applications 310a-310d that is the subject of the current iteration of outer procedure 400-420. These API calls may comprise any calls known in the art, including those that perform common, known operations, such as Discover object, Discover schema, Create Object, Retrieve Object, Update Object, or Delete Object.

In step 420, a processor of integration platform 340 generates information necessary to map one canonical API call used by the endpoint application of applications 310a-310d that is the subject of the current iteration of outer procedure 400-420. This information is stored in a configuration file 330a-330d for that subject application. At the completion of the last iteration of inner procedure 410-420, a complete configuration file 330a-330d for the subject application will have been assembled. At the completion of the last iteration of outer procedure 400-420, a configuration file 330a-330d will have been assembled for every endpoint application 310a-310d that is required to communicate with integration platform 340.

The information generated and stored in this step may describe formatting details of both the canonical API call and of one or more corresponding API calls of the subject application. The generated and stored information may further describe I/O mappings that relate input and output parameters of the canonical API call to input and output parameters of the corresponding API calls.

Similarly, a configuration file 330a-330d may further describe a mapping between canonical and application-specific formats by identifying other differences between the two types of formats. For example, a canonical API may identify data or functionality from a different perspective than the application-specific API, or may do so with a different degree of granularity or level of detail. The two types of API may differ in the way that they impose or identify contextual constraints, or may comprise or point to different types of metadata.

Although this method of mapping APIs by an integration-platform architecture 300 is novel, the concept of mapping messages between a canonical-API format and an application-specific API format is known in the art. Every integration platform that uses any sort of connector architecture, such as the architecture 200 shown in FIG. 2., must incorporate connectors that perform such a mapping, even if those connectors map formats by means of a hard-coded software module that is compatible with only one endpoint application 210a-210d.

In a straightforward implementation, a configuration file 330a-330d may enable a generic connector 340 to map specific and canonical API calls by simply listing corresponding input or output parameters of each API call, including their respective data formats or storage locations. Furthermore, in some embodiments, each canonical API call that may be required by an endpoint application may be assigned its own section of information in that application's configuration file 330a-330d. In other embodiments, a configuration file 330a-330d may instead organize its contents such that a distinct section of those contents are associated with each application-specific API call. Yet other embodiments may comprise configuration files 330a-330d that employ other organizational schemes desired by an implementer.

Figure 5:
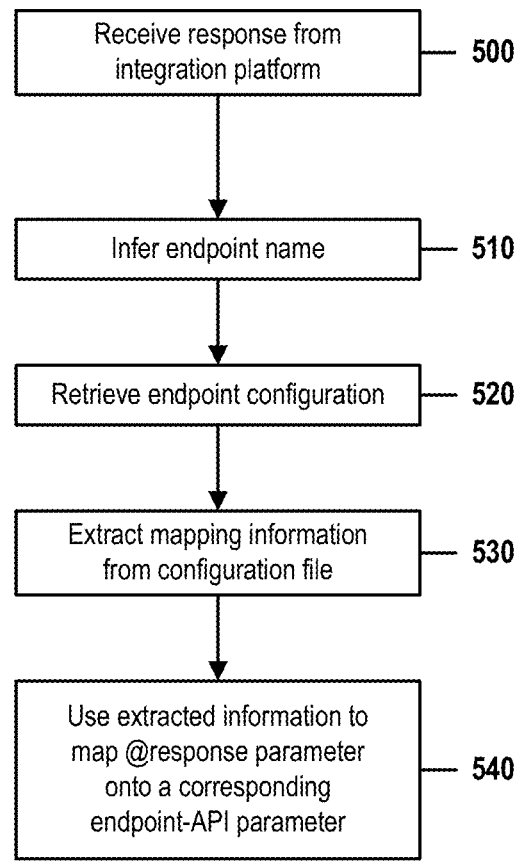
FIG. 5 is a flow chart that illustrates steps of a novel method for translating an integration platform's canonical response to a service request into a format that complies with conventions of an application-specific API.

Embodiments of the present invention are flexible enough to accommodate any known type of mapping that may be desired by an implementer, so long as those mappings may be described by information capable of being stored in a library of configuration files 330a-330d. a Concrete example of such mappings is presented in a detailed example following the description of FIG. 5.

In step 430, the system (for example, the generic connector 320) receives a service request from an endpoint application 310a-310d. This service request may be in the form of an API call that is compliant with an application-specific API used by the endpoint application 310a-310d.

In step 440, the system identifies the endpoint application 310a-310d that generated the service request received in the previous step.

In step 450, the system loads a configuration file 330a-330d that is associated with the request-generating application 310a-310d. This loading may be performed by any means known in the art. In some embodiments, for example, configuration files 330a-330d may already be embedded into the generic connector module 320. In other embodiments, however, configuration files 330a-330d may be organized into one or more data structures extrinsic to the connector 320, such as in a database or in a runtime library. This latter approach allows configuration files 330a-330d to be added, deleted, or modified without requiring any revision to components of the integration-platform architecture 300, and without requiring any components to experience downtime during a rebuild or redeployment procedure.

In step 460, the system extracts the information stored in the loaded configuration file 330a-330d that will be needed to generate one or more canonical-API calls that request operations analogous to the operations requested by the application-specific service request received in step 430.

In step 470, the system uses the extracted information to generate one or more canonical-API calls that request operations analogous to the operations requested by the application-specific service request received in step 430. As described above, this step is performed by means of known mapping operations similar to those that would be performed by a dedicated, application-specific connector 220a-220d written expressly for a specific endpoint application 210a-210d. These mapping operations may comprise, for example, mapping each parameter of the application's service request to one or more corresponding parameters of the generated canonical-API call, or translating a parameter of the application's service request into a data format required of one or more corresponding parameters of the generated canonical-API call.

At the conclusion of step 470, the generic connector 320 will have used information stored in a configuration file 330a-330d to dynamically translate an application-specific API service request received from an endpoint application 310a-310d into an equivalent canonical-API service request capable of being understood by the integration platform 340. Even when implemented by means of static or compiled programming language, this procedure may still generate the required canonical code dynamically by compiling the code on-the-fly in response to extracting the relatively simple data items from the configuration file 330a-330d.

In some embodiments, the generic connector 320 may be capable of receiving canonical API service requests from integration platform 340, translating those requests into a format compatible with a native, application-specific API of an endpoint application 310a-310d by means of methods analogous to those of FIGS. 4 and 5, and then reversing the procedure when returning the application's 310a-310d application-specific response to the platform 340 in canonical form.

In other embodiments, a converse procedure is possible, with the generic connector 320 receiving application-specific API service requests from an endpoint application 310a-310d, translating those requests into a canonical format by means of methods analogous to those of FIGS. 4 and 5, and then forwarding them to integration platform 340, and then reversing this procedure when returning the platform's 340 canonical response to endpoint application 310a-310d.

FIG. 5 is a flow chart that illustrates steps of a novel method for translating an integration platform's canonical response to a service request into a format that complies with conventions of an application-specific API. FIG. 5 comprises items 500-540.

The method of FIG. 5 is converse to the method of FIG. 4. That is, FIG. 4 comprises a procedure by which an application service request that complies with an application-specific API is translated into an equivalent canonical-API service request. Similarly, FIG. 5 translates a response to the canonical-API service request (where that response is formatted in a manner that conforms to rules of the canonical API) into a format that conforms to conventions of the application-specific API.

In step 500, a component of the system (such as a generic connector 320) receives from the integration platform 340 a response to a canonical API service request previously forwarded to the integration platform 340. This response may be formatted in a manner that conforms to conventions of the canonical API.

In step 510, as in step 440 of FIG. 4, the system identities an endpoint application 310a-310d to which a response must be forwarded. This identification may be performed by any means known in the art and may in some cases be accomplished by simply remembering which application 310a-310d generated the application-specific service request to which the integration platform 340 is responding.

In step 520, by means of a procedure similar to that of step 450, the system retrieves a configuration file 330a-330d associated with the endpoint application 310a-3110d identified in step 510.

In step 530, the system performs operations analogous to those of step 460 in order to extract mapping information from the retrieved configuration file 330a-330d. As in step 460, this extracted information will enable generic connector module 320, using means known in the art, to determine how to translate a communication formatted in accordance with conventions of one type of API into a format that complies with conventions of a different type of API.

In step 540, the system uses the extracted configuration information to dynamically perform an operation that is analogous, although converse, to the mapping operation performed in step 470. Here, however, the system uses the extracted information to translate the response received in step 500 from a form that complies with conventions of the canonical API into a form that complies with conventions of the application-specific API used by the requesting endpoint application 310a-310d.

At the conclusion of step 540, a full, bidirectional, API-based set of communication will have been completed. The system, in the form of a generic connector 320, will have received from an endpoint application 310a-310d a service request formatted according to conventions of an application-specific API used by the requesting application 310a-310d. Connector 320 will have then retrieved a configuration file 330a-330d associated with the requesting application 310a-310d and, by referring to information stored in that retrieved configuration file 330a-330d, generated an equivalent service request formatted in a manner compliant with conventions of a canonical API. This canonical request is then forwarded to the integration platform 340 for implementation.

After performing the requested service, integration platform 340 returns to the generic connector 320 a response to the canonical service request, which is formatted in a manner compliant with conventions of the canonical API. As before, the generic connector 320 retrieves and uses information stored in a corresponding information file 330a-330d to dynamically translate the received response into a form that complies with conventions of the application-specific API. The connector then forwards that translated response to the requesting endpoint application 310a-310d.

In one example of the methods of FIGS. 4 and 5, consider a canonical API call "GetUserInfo" that submits a user's username to an endpoint-application database and, in response, receives from the database application that user's unencrypted password and account number:

(1) GetUserInfo(username,pwd,acct#)

Here, input parameter username is a 60-byte alphanumeric parameter that stores a previously entered username, output parameter pwd is a 16-byte character field capable of receiving the user's unencrypted alphanumeric password, and acct# is an address of a 4-byte integer variable capable of pointing to the user's account number.

Equivalent functionality that complies with the database application's native, application-specific, API may be performed by native API calls:

(2) getCredentials(UserRecord,User,SecurePassword)

(3) PWdecrypt(EncryptedPW,OpenPW,Key)

Application-specific API call getCredentials retrieves one user's unencrypted account information and encrypted user password from an Account table of the database and PWdecrypt decodes the encrypted password into an unencrypted form expected by the canonical API call GetUserInfo.

Application-specific API call getCredentials comprises the following parameters:

UserRecord is an address of a record of the Account table, where each record of the Account table stores unencrypted information identifying one particular user, SecurePassword is an encrypted password retrieved from a UserPW table of the database that stores encrypted user passwords, and User is a 40-byte user identifier that can be used to query records of the Account and UserPW tables.

Application-specific API call PWdecrypt comprises the following parameters:

EncryptedPW is equivalent to the encrypted password SecurePassword retrieved by API call getCredentials, OpenPW is an decrypted version of encrypted password EncryptedPW, and Key is a decryption key, stored in the configuration file specific to the database application, capable of being used to decrypt EncryptedPW into OpenPW.

A configuration file associated with the DBMS endpoint application 310a contains information needed by generic connector 340 to translate functionality of an incoming canonical GetUserInfo API call into equivalent functionality of application-specific getCredentials and PWdecrypt API calls. This translation may be performed by any combination of steps known in the art, but generally includes mapping parameters of a canonical API call onto parameters of one or more application-specific APIs. In certain embodiments, the translation also includes reconciling incompatible data formats of corresponding canonical and application-specific parameters.

In the current example, the configuration file might comprise information that:

identifies a data format of each parameter of the three APIs;

specifies that the first 40 bytes of the 60-byte canonical parameter username should be mapped onto the application-specific parameter User;

specifies that a first field of the database record pointed to by the retrieved application-specific UserRecord parameter should be mapped onto the canonical parameter acct#;

specifies that the retrieved application-specific parameter SecurePassword getCredentials should be passed to API call PWdecrypt as input parameter EncryptedPW;

identifies a decryption key value capable of being used to decrypt the encrypted retrieved password SecurePassword;

specifies that the key value should be mapped to application-specific input parameter Key; and specifies that the application-specific OpenPW output parameter returned by PWdecrypt should be mapped to canonical output parameter pwd.

The method of FIGS. 4 and 5 may be adapted to this example by means of the following steps.

The integration platform 340, in response to receiving a request for User003's credentials from a hosted application or system, sends to the generic connector 320 a canonical API call:

GetUserinfo(User003,pwd,acct#).

The generic connector 320 responds by selecting a configuration file associated with a database application 310a capable of responding to the GetUserInfo service request. As described above, the connector 320 uses the contents of the configuration file to assemble two application-specific API calls that provide functionality equivalent to that of the canonical request:

```
getCredentials(UserRecord,User003,SecurePassword)
PWdecrypt(EncryptedPW,OpenPW,Key)
```

Connector 320 transmits the getCredentials API call to endpoint database application 310a, Application 310a services the getCredentials call, returning a pointer to the database record of User003's user-account information as parameter UserRecord, and returning an encrypted form of User003's password as parameter SecurePassword.

Connector 320 next transmits the PWdecrypt API service request to the database application 310a, mapping the previously returned encrypted password SecurePassword onto PWdecrypt input parameter EncryptedPW and mapping the decryption key stored in the configuration file onto PWdecrypt input parameter Key.

When PWdecypt returns the decrypted key as output parameter OpenPW, generic connector 320 maps OpenPW onto canonical parameter pwd and maps a pointer to the first field of the retrieved UserRecord onto canonical parameter acct#. Connector 320 then returns canonical parameters pwd and acct# to the integration platform 340 in a canonical form capable of being understood by the platform 340.

What is claimed is:

1. A generic connector module of an integration-platform system comprising a processor, a memory coupled to the processor, and a computer-readable hardware storage device coupled to the processor, the storage device containing program code configured to be run by the processor via the memory to implement a method for integrating a set of endpoint applications into a computing platform, the method comprising:

receiving, from the integration-platform system, a canonical service request generated by the integration-platform system, where the canonical service request is configured in compliance with conventions of a canonical application programming interface, where the canonical service request was generated in response to the integration-platform system intercepting a communication sent by the computing platform, where the communication was originally directed to a first application of the set of endpoint applications, and where the canonical service request is associated with first identifying information capable of identifying the first application;

selecting, as a function of the first identifying information, a first configuration file of a set of application-specific configuration files;

extracting first configuration data from the first configuration file, where the first configuration data is specific to the first application;

generating an application-specific service request that is functionally equivalent to the canonical service request, where the application-specific service request is configured, as a function of the first configuration data, in compliance with conventions of a first application-specific application programming interface associated with the first application;

transmitting the application-specific service request to the first application;

intercepting an application-specific response returned by the first application in response to receiving the application-specific service request, where the application-specific response is configured in compliance with conventions of the first application-specific application programming interface;

producing a canonical response that is functionally equivalent to the application-specific response, where the canonical response is configured, as a function of the first configuration data, in compliance with conventions of the canonical application programming interface; and transmitting the canonical response to the integration platform.

2. The integration-platform system of claim 1, further comprising:

receiving notice that a second application of the set of endpoint applications is configured to operate on the computing platform;

determining that the second application is configured to send and receive messages that comply with conventions of a second application-specific application programming interface;

generating a set of parameter mappings that each relate an input parameter or an output parameter of a canonical command of the canonical application programming interface with a corresponding input parameter or a corresponding output parameter of functionally equivalent API commands, where the functionally equivalent API commands comply with conventions of the second application-specific application programming interface;

further generating a set of format mappings that each relate a syntax of the canonical command with a syntax of the functionally equivalent API commands;

creating a second configuration file of the set of application-specific configuration files, where the second configuration file comprises the parameter mappings and the format mappings; and storing the second configuration file in a manner that enables the generic connector to associate the second configuration file with the second application.

3. The integration-platform system of claim 2, where at least one of the functionally equivalent API commands comprises two or more instructions that comply with conventions of the second application-specific application programming interface.

4. The integration-platform system of claim 1,
where the set of application-specific configuration files is a software library that may be accessed dynamically by the generic connector, and
where no modification to the generic connector is required in order to revise configuration files stored in the software library, to add new configuration files to the software library, or to delete existing configuration files from the software library.

5. The integration-platform system of claim 1, where the first identifying information is capable of identifying the first configuration file and the first application-specific application programming interface.

6. The integration-platform system of claim 1, further comprising:
intercepting an application service request sent by a third application of the set of endpoint applications,
where the application service request is configured in compliance with conventions of a third application-specific application programming interface,
where the application service request had originally been directed to a component of the computing platform, and
where the application service request is associated with a third set of identifying information;
selecting, as a function of the third set of identifying information, a third configuration file of the set of application-specific configuration files;
extracting third configuration data from the third configuration file;
generating a canonical service request that is functionally equivalent to the application service request, where the canonical service request is configured, as a function of the third configuration data, in compliance with conventions of the canonical application programming interface;
transmitting the canonical service request to the integration-platform system;
intercepting a canonical response returned by the integration-platform system in response to receiving the canonical service request, where the canonical response is configured in compliance with conventions of the canonical application programming interface;
producing an application-specific response that is functionally equivalent to the canonical response, where the application-specific response is configured, as a function of the third configuration data, in compliance with conventions of the third application-specific application programming interface; and
transmitting the application-specific response to the third application.

7. A method for integrating a set of endpoint applications into a computing platform, the method comprising:
receiving, from an integration-platform system by a generic connector module, a canonical service request generated by the integration-platform system,
where the canonical service request is configured in compliance with conventions of a canonical application programming interface,
where the canonical service request was generated in response to the integration-platform system intercepting a communication sent by the computing platform,
where the communication was originally directed to a first application of a set of endpoint applications, and
where the canonical service request is associated with first identifying information capable of identifying the first application;
selecting, as a function of the first identifying information, a first configuration file of a set of application-specific configuration files;
extracting first configuration data from the first configuration file, where the first configuration data is specific to the first application;
generating an application-specific service request that is functionally equivalent to the canonical service request, where the application-specific service request is configured, as a function of the first configuration data, in compliance with conventions of a first application-specific application programming interface associated with the first application;
transmitting the application-specific service request to the first application;
intercepting an application-specific response returned by the first application in response to receiving the application-specific service request, where the application-specific response is configured in compliance with conventions of the first application-specific application programming interface;
producing a canonical response that is functionally equivalent to the application-specific response, where the canonical response is configured, as a function of the first configuration data, in compliance with conventions of the canonical application programming interface; and
transmitting the canonical response to the integration platform.

8. The method of claim 7, further comprising:
receiving notice that a second application of the set of endpoint applications is configured to operate on the computing platform;
determining that the second application is configured to send and receive messages that comply with conventions of a second application-specific application programming interface;
generating a set of parameter mappings that each relate an input parameter or an output parameter of a canonical command of the canonical application programming interface with a corresponding input parameter or a corresponding output parameter of functionally equivalent API commands, where the functionally equivalent API commands comply with conventions of the second application-specific application programming interface;
further generating a set of format mappings that each relate a syntax of the canonical command with a syntax of the functionally equivalent API commands;
creating a second configuration file of the set of application-specific configuration files, where the second configuration file comprises the parameter mappings and the format mappings; and
storing the second configuration file in a manner that enables the generic connector to associate the second configuration file with the second application.

9. The method of claim 8, where at least one of the functionally equivalent API commands comprises two or more instructions that comply with conventions of the second application-specific application programming interface.

10. The method of claim 7,
where the set of application-specific configuration files is a software library that may be accessed dynamically by the generic connector, and
where no modification to the generic connector is required in order to revise configuration files stored in the software library, to add new configuration files to the software library, or to delete existing configuration files from the software library.

11. The method of claim 7, further comprising:
intercepting an application service request sent by a third application of the set of endpoint applications,
where the application service request is configured in compliance with conventions of a third application-specific application programming interface,
where the application service request had originally been directed to a component of the computing platform, and
where the application service request is associated with a third set of identifying information;
selecting, as a function of the third set of identifying information, a third configuration file of the set of application-specific configuration files;
extracting third configuration data from the third configuration file;
generating a canonical service request that is functionally equivalent to the application service request, where the canonical service request is configured, as a function of the third configuration data, in compliance with conventions of the canonical application programming interface;
transmitting the canonical service request to the integration-platform system;
intercepting a canonical response returned by the integration-platform system in response to receiving the canonical service request, where the canonical response is configured in compliance with conventions of the canonical application programming interface;
producing an application-specific response that is functionally equivalent to the canonical response, where the application-specific response is configured, as a function of the third configuration data, in compliance with conventions of the third application-specific application programming interface; and
transmitting the application-specific response to the third application.

12. The method of claim 7, further comprising providing at least one support service for at least one of creating, integrating, hosting, maintaining, and deploying computer-readable program code in the computer system, wherein the computer-readable program code in combination with the computer system is configured to implement the receiving, the selecting, the extracting, the generating, the transmitting the application-specific service request, the intercepting, the producing, and the transmitting the canonical response.

13. A computer program product, comprising a computer-readable hardware storage device having a computer-readable program code stored therein, the program code configured to be executed by an integration-platform system comprising a processor, a memory coupled to the processor, and a computer-readable hardware storage device coupled to the processor, the storage device containing program code configured to be run by the processor via the memory to implement a method for generic connector module of an integration-platform system comprising a processor, a memory coupled to the processor, and a computer-readable hardware storage device coupled to the processor, the storage device containing program code configured to be run by the processor via the memory to implement a method for integrating a set of endpoint applications into a computing platform, the method comprising:
receiving, from the integration-platform system, a canonical service request generated by the integration-platform system,
where the canonical service request is configured in compliance with conventions of a canonical application programming interface,
where the canonical service request was generated in response to the integration-platform system intercepting a communication sent by the computing platform,
where the communication was originally directed to a first application of the set of endpoint applications, and
where the canonical service request is associated with first identifying information capable of identifying the first application;
selecting, as a function of the first identifying information, a first configuration file of a set of application-specific configuration files;
extracting first configuration data from the first configuration file, where the first configuration data is specific to the first application;
generating an application-specific service request that is functionally equivalent to the canonical service request, where the application-specific service request is configured, as a function of the first configuration data, in compliance with conventions of a first application-specific application programming interface associated with the first application;
transmitting the application-specific service request to the first application;
intercepting an application-specific response returned by the first application in response to receiving the application-specific service request, where the application-specific response is configured in compliance with conventions of the first application-specific application programming interface;
producing a canonical response that is functionally equivalent to the application-specific response, where the canonical response is configured, as a function of the first configuration data, in compliance with conventions of the canonical application programming interface; and
transmitting the canonical response to the integration platform.

14. The computer program product of claim 13, further comprising:
receiving notice that a second application of the set of endpoint applications is configured to operate on the computing platform;
determining that the second application is configured to send and receive messages that comply with conventions of a second application-specific application programming interface;
generating a set of parameter mappings that each relate an input parameter or an output parameter of a canonical command of the canonical application programming interface with a corresponding input parameter or a corresponding output parameter of functionally equivalent API commands, where the functionally equivalent API commands comply with conventions of the second application-specific application programming interface;

further generating a set of format mappings that each relate a syntax of the canonical command with a syntax of the functionally equivalent API commands;

creating a second configuration file of the set of application-specific configuration files, where the second configuration file comprises the parameter mappings and the format mappings; and storing the second configuration file in a manner that enables the generic connector to associate the second configuration file with the second application.

15. The computer program product of claim 14, where at least one of the functionally equivalent API commands comprises two or more instructions that comply with conventions of the second application-specific application programming interface.

16. The computer program product of claim 13,
where the set of application-specific configuration files is a software library that may be accessed dynamically by the generic connector, and
where no modification to the generic connector is required in order to revise configuration files stored in the software library, to add new configuration files to the software library, or to delete existing configuration files from the software library.

17. The computer program product of claim 13, further comprising:
intercepting an application service request sent by a third application of the set of endpoint applications,
where the application service request is configured in compliance with conventions of a third application-specific application programming interface,
where the application service request had originally been directed to a component of the computing platform, and
where the application service request is associated with a third set of identifying information;

selecting, as a function of the third set of identifying information, a third configuration file of the set of application-specific configuration files;

extracting third configuration data from the third configuration file;

generating a canonical service request that is functionally equivalent to the application service request, where the canonical service request is configured, as a function of the third configuration data, in compliance with conventions of the canonical application programming interface;

transmitting the canonical service request to the integration-platform system;

intercepting a canonical response returned by the integration-platform system in response to receiving the canonical service request, where the canonical response is configured in compliance with conventions of the canonical application programming interface;

producing an application-specific response that is functionally equivalent to the canonical response, where the application-specific response is configured, as a function of the third configuration data, in compliance with conventions of the third application-specific application programming interface; and transmitting the application-specific response to the third application.

* * * * *